US007499712B2

(12) United States Patent
Riley et al.

(10) Patent No.: US 7,499,712 B2
(45) Date of Patent: Mar. 3, 2009

(54) POSITION COMPUTATION IN A POSITIONING SYSTEM USING SYNCHRONIZATION TIME BIAS

(75) Inventors: Wyatt T. Riley, King of Prussia, PA (US); Grant Marshall, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 10/632,637

(22) Filed: Jul. 31, 2003

(65) Prior Publication Data

US 2004/0077311 A1 Apr. 22, 2004

Related U.S. Application Data

(60) Provisional application No. 60/408,614, filed on Sep. 5, 2002.

(51) Int. Cl.
*H04Q 7/20* (2006.01)

(52) U.S. Cl. ............................... 455/456.1; 342/357.12

(58) Field of Classification Search ................. 455/502, 455/517, 456, 456.1, 561, 408, 414.2, 13.2, 455/440, 448, 404.2, 456.2, 456.3, 456.4, 455/456.5, 456.6, 67.11; 342/357.12, 357.06, 342/387, 357.14, 358, 357.15, 357.16, 347.17
See application file for complete search history.

(56) References Cited

U.S. PATENT DOCUMENTS

| | | | | |
|---|---|---|---|---|
| 6,188,354 | B1 | 2/2001 | Soliman et al. | 342/387 |
| 6,249,253 | B1 | 6/2001 | Nielsen et al. | 342/463 |
| 6,252,543 | B1 | 6/2001 | Camp | 342/357.06 |
| 6,289,280 | B1 | 9/2001 | Fernandez-Corbaton et al. | 701/214 |
| 6,445,927 | B1 * | 9/2002 | King et al. | 455/456.6 |
| 6,707,422 | B2 * | 3/2004 | Sheynblat et al. | 342/357.12 |
| 6,847,826 | B1 * | 1/2005 | Wesby et al. | 455/502 |
| 2001/0026241 | A1 * | 10/2001 | Tamura et al. | 342/387 |
| 2003/0069033 | A1 * | 4/2003 | Edge et al. | 455/502 |
| 2003/0236818 | A1 * | 12/2003 | Bruner et al. | 709/200 |

FOREIGN PATENT DOCUMENTS

| | | | |
|---|---|---|---|
| WO | 0173467 | A2 | 10/2001 |

* cited by examiner

*Primary Examiner*—Tu X Nguyen
(74) *Attorney, Agent, or Firm*—Andrea L. Mays; Andrea L. Mays; Thomas R. Rouse

(57) ABSTRACT

In general, this disclosure is directed to techniques for computing a positioning solution for a mobile unit based on signals received from the satellite navigation system and the wireless communication system. The techniques allow for, and resolve, a synchronization bias that constrains a system time for the satellite navigation system and a system time for the wireless communication system relative to each other. The mobile unit may utilize the defined constraint to compute a position solution in environments where additional independent measurements would otherwise be required. The mobile unit may incorporate Receiver Autonomous Integrity Monitoring (RAIM) functionality to validate the position and time solutions derived from each of received signals. According to the techniques described herein, the mobile unit may be able to utilize the defined synchronization bias to apply RAIM or similar techniques in environments where such techniques would otherwise be indeterminate.

68 Claims, 4 Drawing Sheets

POSITION COMPUTATION IN A POSITIONING SYSTEM USING SYNCHRONIZATION TIME BIAS

RELATED APLICATIONS

This application claims priority to U.S. Provisional Application Ser. No. 60/408,614, filed on Sep. 5, 2002.

TECHNICAL FIELD

This disclosure relates to positioning systems and, more particularly, to the computation of position solutions for mobile receivers.

BACKGROUND

The Global Positioning System (GPS) is a satellite navigation system designed to provide position, velocity and time information almost anywhere in the world. GPS was developed by the Unites States Department of Defense, and currently includes a constellation of twenty-four operational satellites. Other types of satellite navigation systems includes the Wide Area Augmentation System (WAAS), the Global Navigation Satellite System (GLONASS) deployed by the Russian Federation, and the Galileo system planned by the European Union.

A variety of receivers have been designed to decode the signals transmitted from the satellites for the purposes of determining position, velocity or time. In general, to decipher the signals and compute a final position, the receiver must acquire signals from the satellites in view, measure and track the received signals, and recover navigational data from the signals. By accurately measuring the distance from three different satellites, the receiver triangulates its position, i.e., solves for a latitude, longitude and altitude. In particular, the receiver measures distance by measuring the time required for each signal to travel from the respective satellite to the receiver. This requires precise time information. For this reason, measurements from a fourth satellite are typically required to help resolve time measurement errors, e.g., errors created by the inaccuracies of timing circuits within the receiver.

In certain locations, e.g., urban environments with tall buildings, the receiver may only be able to acquire signals from three or less satellites. In these situations, the receiver will be unable to resolve all four variables of the position solution: latitude, longitude, altitude, and time. If the receiver is able to acquire signals from three satellites, for example, the receiver may forego an altitude calculation to resolve latitude, longitude and time. If less than three signals are available, the receiver may be unable to calculate its position.

To address this limitation, many receivers employ hybrid location technology that makes use of signals from base stations of a wireless communication system. As with satellite signals, the hybrid receivers measure time delays of the wireless signals to measure distances from the base stations of the network. The hybrid receivers utilize the signals from the base stations, as well as any acquired signals from GPS satellites, to resolve the position and time variables. The hybrid location technique often allows a receiver to compute a position solution in a wide variety of locations where conventional positioning techniques would fail. In code division multiple access (CDMA) systems, for example, this base station measurement portion of this hybrid technique is referred to as Advanced Forward Link Trilateration (AFLT).

The accuracy of the location solution determined by the receiver is affected by the degree of time precision within the system. In synchronized systems, such as existing CDMA systems, the timing information communicated by the cellular base stations is synchronized with the timing information from the GPS satellites, allowing precise time to be available throughout the system. In some systems, such as the Global System for Mobile Communications (GSM), the timing information is not synchronized between the base stations and the GPS satellites. In these systems, Location Measurement Units (LMUs) are added to the existing infrastructure to provide precise timing information for the wireless network.

SUMMARY

In general, this disclosure is directed to techniques for computing a positioning solution for a mobile unit. In particular, the techniques allow for, and resolve, a synchronization bias that may define a difference between a system time for a satellite navigation system and a system time for a wireless communication system. Using a time bias, referred to herein as a "synchronization bias," the techniques may improve the accuracy and reliability of the position solution provided by the mobile unit.

For example, in one embodiment, a method comprises receiving signals from a satellite navigation system and signals from a wireless communication system, and determining a position solution for a mobile unit as a function of the of signals using a synchronization bias that defines a difference between a system time for the satellite navigation system and a system time for the wireless communication system.

In another embodiment, a method comprises receiving sets of position related measurements for a device, the measurements of each of the sets having a common bias with respect to the measurements of the other set. The method further comprises determining a position solution for the device as a function of the measurements and the common bias.

In another embodiment, a method comprises receiving a request from a mobile unit operating within an environment having a satellite navigation system and a wireless communication system, and communicating to the mobile unit, in response to the request, synchronization bias data that constrains a system time of the satellite navigation system as a function of a system time of the wireless communication system.

In another embodiment, a system comprises a server to store synchronization bias data that defines a difference between a system time for a satellite navigation system and a system time for a wireless communication system. The system further comprises a mobile unit to receive the synchronization bias data from the server, and determine a position solution as a function of the synchronization bias data and signals received from the satellite navigation system and the wireless communication system.

In another embodiment, an apparatus comprises one or more antennas to receive signals from a satellite navigation system and a wireless communication system. The apparatus further comprises a processor to determine a position solution for a mobile unit as a function of the signals using a synchronization bias that defines a difference between a system time for the satellite navigation system and a system time for the wireless communication system.

In another embodiment, a computer-readable medium comprises instructions for causing a programmable processor to determine a position solution for a mobile unit as a function of signals received from a satellite navigation system, signals received from a wireless communication system, and a synchronization bias that defines a difference between a system time for the satellite navigation system and a system time for the wireless communication system.

In another embodiment, a computer-readable medium comprises data structure to store one or more synchronization biases for computing position solutions for one or more mobile units, where each of the synchronization biases defines a difference between a system time for a satellite navigation system and a system time for a wireless communication system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
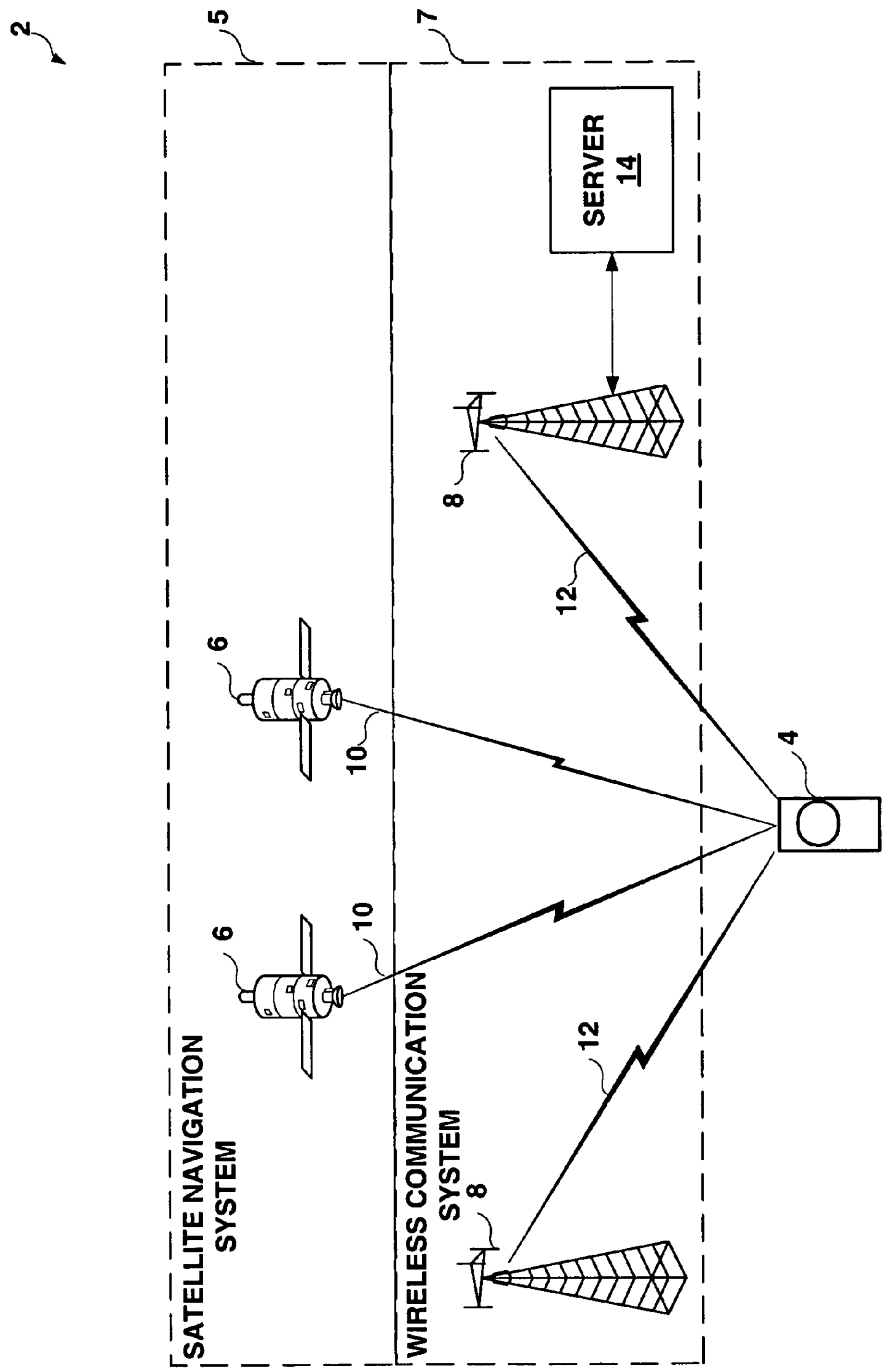
FIG. 1 is a block diagram illustrating an example system in which a mobile unit computes a position solution using a synchronization bias that constrains a system time for a wireless communications system with respect to a system time for a satellite navigation system.

FIG. 1 is a block diagram illustrating an example synchronous environment 2 in which a mobile unit 4 makes use of a "synchronization bias" to compute a position location. Environment 2 is referred to as a synchronous environment in that satellite navigation system 5 and communication network 7 are designed to have synchronous system times. In other words, satellites 6 and base stations 8 are designed to produce precisely synchronized timing information. Nevertheless, mobile unit 4 allows for, and resolves, a synchronization bias that may define a difference between the system time for satellite navigation system 5 and the system time for wireless communication system 7. An example of satellite navigation system 5 is the Global Positioning System (GPS) developed by the Unites States Department of Defense. Other types of satellite navigation systems includes the Wide Area Augmentation System (WAAS), the Global Navigation Satellite System (GLONASS) deployed by the Russian Federation, and the Galileo system planned by the European Union.

Mobile unit 4 employs techniques to compute a positioning solution based on signals 10, 12 received from satellites 6 and base stations 8, respectively. Mobile unit 4 acquires signals 10 from satellites 6 in view, and measure distance from each satellite by measuring the time required for each signal to travel from the respective satellite to mobile unit 4. Similarly, mobile unit 4 receives signals 12 from base stations 8 of wireless communication system 7, and measure distances from base stations 8 based on the time required for each wireless signal to travel from the base stations to the mobile unit. Mobile unit 4 resolves position and time variables based on the measurements.

The techniques employed by mobile unit 4 are based on the recognition that even in a synchronous environment 2, a synchronization error, i.e., a synchronization bias, may exist between the system times of satellite navigation system 5 and a wireless communication system 7. This time difference may result from a number of factors, such as different propagation delays in timing circuits employed by mobile unit 4 to process the different types of signals 10, 12. Other causes for the synchronization bias include common propagation delays within transmitters of base stations 8, and the fact that signals 12 from base stations 8 tend to arrive at mobile unit 4 at a much lower elevation angle than signals 10 from satellites 8. This lower elevation angle may cause signals 12 from base stations 8 to bounce off more objects (not shown) within environment 2 than signals 10 from satellites 6, leading to excess measurement signal path-lengths in the timing information computed by mobile unit 4 for base stations 8.

Accordingly, the synchronization bias can be viewed as a common bias between two systems, i.e., the satellite navigation system 5 and the wireless communication system 7 to which satellites 6 and base stations 8 belong, respectively. In other words, from the perspective of mobile unit 4, a common synchronization bias may exist between the two systems 5, 7, even though the systems are designed to operate synchronously in time.

In cases where systems 5,7 are considered very well synchronized, hybrid positioning techniques can be used to solve for a single receiver time in addition to latitude, longitude and altitude. In cases where the two system times are not well synchronized, referred to herein as asynchronous environments, asynchronous techniques may be used to resolve independent system times, but require an additional measurement by mobile unit 4 to produce accurate results. For example, the asynchronous techniques may require at least five measurements for resolution of five independent variables: latitude, longitude, altitude, precise time for the satellites, and precise time for the wireless network. Altitude-aiding techniques may be used to provide an extra measurement for use in calculating the position solution, thereby reducing the number of measurements needed. Nevertheless, synchronous techniques using altitude-aiding may require three measurements, while asynchronous techniques require an additional fourth measurement to compute an accurate position solution.

In these situations, mobile unit 4 may nevertheless compute an accurate position solution by utilizing a defined constraint that relates the system times, thereby allowing resolution of a position solution using asynchronous techniques without requiring an additional independent measurement. Specifically, to compensate for this synchronization error between systems 5, 7, mobile unit 4 employs location techniques that allow a synchronization bias to express the time for one of the systems 5, 7 of synchronous environment 2 as a function of the time for the other system. As one example, the synchronization bias may define the system time for one of systems 5, 7 as within a defined range from the system time of the other system. For example, mobile unit 4 may be configured to define the system time for network communication system 7 as within a time delta, e.g., ±1 microsecond, from the system time of the satellite navigation system 5. As another example, the synchronization bias may define system time for one of systems 5, 7 as a time offset from the system time of the other system. In this manner, the techniques allow the synchronization bias to be constrained, and allow the times of the systems to be related in accordance with a single equation that may be used in lieu of an additional measurement to calculate an accurate position solution.

As described in detail below, mobile unit 4 may use this additional constraint to compute a position solution. In particular, mobile unit 4 may compute the position solution as if environment 2 were an asynchronous environment, i.e., an environment having different times for satellite navigation system 5 and wireless communication network 7, but constrains the system times in accordance with the defined synchronization bias. Consequently, mobile unit 4 is referred to herein as capable of operating in a "semi-synchronous" mode to compute a position solution in synchronous environment 2. This technique may allow mobile unit 4 to compute a position solution with greater accuracy in a wide variety of locations where conventional position calculation techniques would fail or produce less accurate results.

In addition, mobile unit 4 may incorporate Receiver Autonomous Integrity Monitoring (RAIM) functionality that enables the mobile unit to validate the position and time solutions derived from each of received signals 10, 12. As described above, the successful acquisition of signals 10, 12 from at least four sources is generally required for mobile unit 4 to compute a complete position solution. The acquisition of five or more signals 10, 12 provides for redundant measurements, and often allows mobile unit 4 to detect the presence of an erroneous measurement from one or more signals, depending on the total number of signals acquired. Mobile unit 4 may utilize the redundant measurements to detect an erroneous measurement from one or more of the signals, either from the GPS system or the wireless communication system, and to isolate the measurement from the position solution computation.

According to the techniques described herein, mobile unit 4 may be able to utilize the defined synchronization bias to apply RAIM or similar techniques in environments where such techniques would be indeterminate. For example, the additional constraint defined by the synchronization bias may allow mobile unit 4 to apply RAIM when only four signals are acquired. In this environment, the additional constraint can be used to provide the redundancy that would otherwise be provided by the fifth satellite signal. If mobile unit 4 acquires more than five signals, the mobile unit may apply conventional RAIM techniques, and may incorporate the constraining synchronization bias into the validation process.

Mobile unit 4 may receive synchronization bias data from a component of wireless communication system 7, such as one of base stations 8. In particular, wireless communication system 7 may include one or more servers 14 to maintain and store synchronization bias data. Server 14 may store data that defines a system-wide synchronization bias. In addition, server 14 may store data defining a set of synchronization biases, and may associate the synchronization biases with identifiers for a plurality of mobile units 4. In other words, sewer 14 may maintain synchronization bias data that is specific to the particular mobile unit 4. In this manner, the synchronization bias data may compensate for fine difference in timing circuits, timing calibration, and other variations between mobile units 4. Further, server 14 may store synchronization bias data for different regions, e.g., groups of cells, within wireless network 5. Consequently, sewer 14 may arrange the synchronization bias data in accordance with identifiers for the respective regions of the wireless communication system.

Server 14 may store the synchronization bias data in a variety of forms, including data storage files, or one or more database management systems (DBMS) executing on one or more database servers. The database management systems may be a relational (RDBMS), hierarchical (HDBMS), multidimensional (MDBMS), object oriented (ODBMS or OODBMS) or object relational (ORDBMS) database management system. The data could, for example, be stored within a single relational database, such as SQL Server™ from Microsoft Corporation.

Mobile unit 4 may take the form of any one of a variety of mobile receivers capable of receiving satellite navigation signals 10, as well as wireless communication signals 12, for computing a position solution. Examples include a enabled mobile phone, a handheld receiver, a receiver mounted within a vehicle, such as an airplane, automobile, truck, tank, ship, and the like. Base stations 8 may communicate with mobile unit 4 in accordance with any one of a number of wireless communication protocols in a synchronous environment. One common wireless communication protocol is code division multiple access (CDMA) in which multiple communications are simultaneously conducted over a radio-frequency (RF) spectrum. In a CDMA environment, the techniques may be viewed as a mechanism for enhanced Advanced Forward Link Trilateration (AFLT). Other examples include Global System for Mobile Communications (GSM), which uses narrowband time-division multiple access for communicating data, and General Packet Radio Service (GPRS). In some embodiments, mobile unit 4 may integrate both a GPS receiver and a wireless communication device for voice or data communication.

Figure 2:
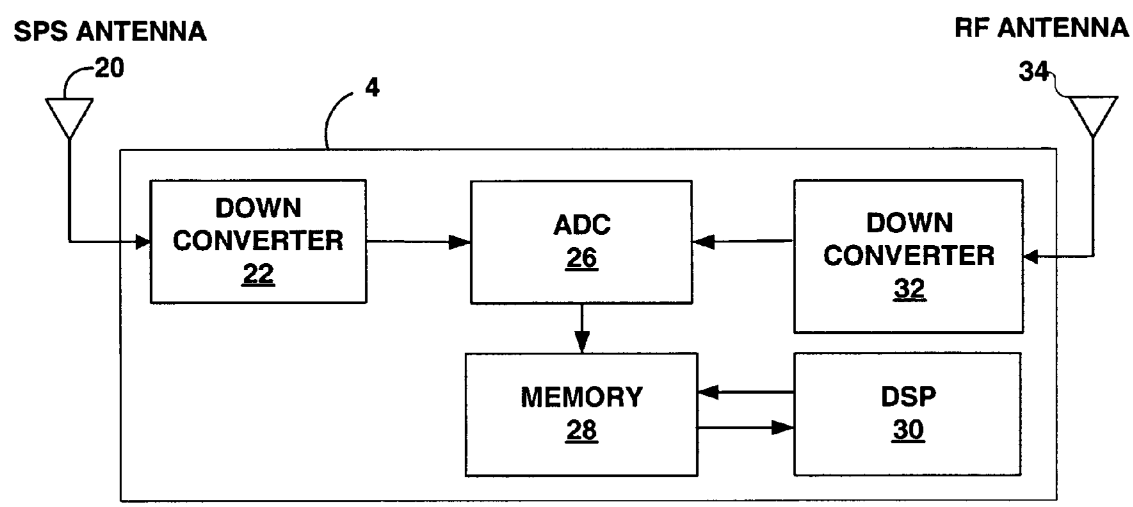
FIG. 2 is a block diagram illustrating an example embodiment of the mobile unit.

FIG. 2 is a block diagram illustrating an example mobile unit 4 in further detail. In general, mobile unit 4 includes a satellite positioning system (SPS) antenna 20, RF antenna 34, down converter 22, analog-to-digital converter (ADC) 26, memory 28, and digital signal processor (DSP) 30 for receiving and acquiring signals 10, 12 from satellites 6 and base stations 8, respectively.

Down converter 22 receives signals 10 from satellites 8 via SPS antenna 20, and convert the signals from an SPS carrier frequency to a baseband frequency for processing. Down converter 22 may first convert the signals 10 to an intermediate frequency for conditioning, and then convert the conditioned signal to the baseband frequency. Alternatively, down converter 22 may implement a zero intermediate frequency (ZIF) architecture for direct conversion to baseband. Similarly, down converter 32 converts signals 12 received from RF antenna 34 to a baseband frequency. Although a common antenna may be used for satellite and cellular communications, separate antennas may be preferred because the cellular signals 12 and satellite signals 10 typically use different RF bands.

ADC 26 samples the baseband signals to produce digitized representations of the signals, and stores the digitized representations in memory 28. For example, memory 28 may store a contiguous set of digitized data, typically corresponding to a duration of approximately 100 ms to 1 second of the baseband signal, or longer, for use by DSP 30 during the acquisition process.

DSP 30 uses the digitized representations of the signals, as well as the synchronization bias as an additional constraint, to compute a position solution. In particular, DSP 30 may apply asynchronous position solution techniques to compute system times for satellite navigation system 5 and wireless communication network 7, but constrains the system times in accordance with the defined synchronization bias. Consequently, DSP 30 operates in a semi-synchronous mode to compute a position solution in synchronous environment 2.

DSP 30 may store data defining the synchronization bias within memory 28, internal on-chip memory, or other suitable computer-readable media. In other words, the synchronization bias may be hard-coded within mobile unit 4. Alternatively, DSP 30 may receive via RF antenna 34 synchronization bias data from a component of wireless communication system 8, such as a base station controller (not shown).

DSP 30 typically operates according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. Although described in reference to a digital signal processor, other forms of an embedded processor or controller can be used within mobile unit 4.

Figure 3:
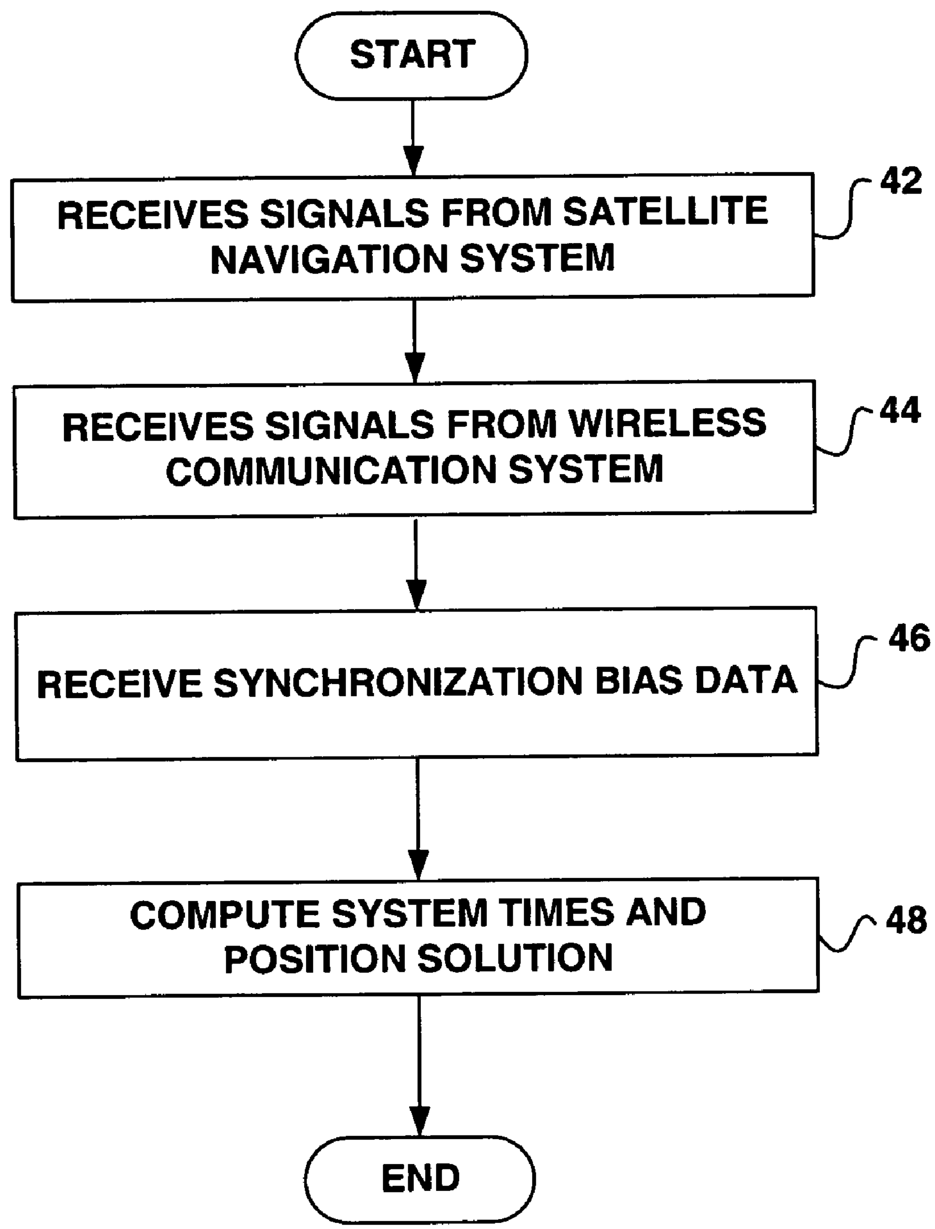
FIG. 3 is a flow chart illustrating an example mode of operation of the mobile unit.

FIG. 3 is a flow chart further illustrating exemplary operation of mobile unit 4. To compute a position solution, mobile unit 4 receives satellite signals 10 from satellite navigation system 5 via SPS antenna 20 (42), and receives RF signals 12 from wireless communication system 7 via wireless modem 32 and RF antenna 34 (44).

In addition, mobile unit 4 receives synchronization bias data that defines a difference between a system time for satellite navigation system 5 and a system time for wireless communication system 7 (46). As described above, the synchronization bias may define the system time for one of systems 5, 7 as within a defined range from the system time of the other system. As another example, the synchronization bias may define system time for one of systems 5,7 as a time offset from the system time of the other system. Mobile unit 4 may receive the data from a component of wireless communication system 7, such as one of base station 8, which may retrieve the synchronization bias data from a central database. Alternatively, mobile unit 4 may retrieve the synchronization bias data from internal memory, as described above in reference to FIG. 2.

Based on the received signals and the defined synchronization bias, mobile unit 4 computes the system times for system 5,7 and a position solution (48). For example, mobile unit 4 may determine system times, a latitude, a longitude and an altitude for mobile unit 4 as a function of the acquired signals and the constraint defined by the synchronization bias data. Mobile unit 4 may apply asynchronous techniques to compute the position, making use of the constraining relationship defined between the system times for satellite navigation system 5 and wireless communication system 7 based on the synchronization bias.

Figure 4:
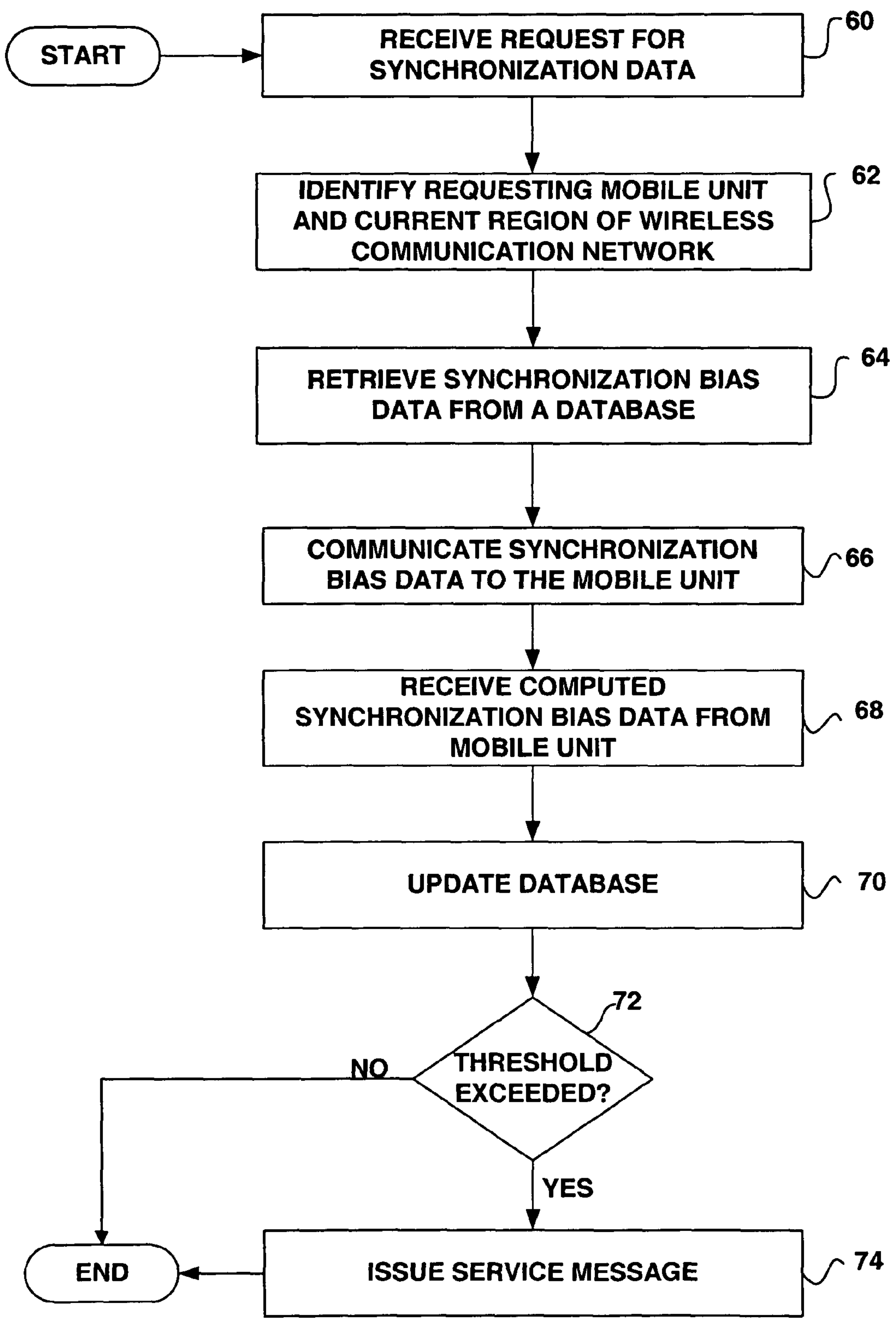
FIG. 4 is a flowchart further illustrating an exemplary process for calculating a pseudorange for a given satellite according to techniques described herein.

FIG 4 is a flowchart further illustrating an exemplary mode of operation of sewer 14. Initially, server 14 receives a request from mobile unit 4 for synchronization data, typically via one or more base stations 8 (60). In response, server 14 may identify the requesting mobile unit 4, and the region of wireless communication network 7 Within which the mobile unit is currently operating (62). Next, sewer 14 retrieves synchronization bias data, e.g., from a database, and communicates the data to mobile unit 4 (64, 66). As described above, sewer 14 may retrieve and communicate a system-wide synchronization bias, a synchronization bias specific to the requesting mobile unit, a synchronization bias specific to the current region, or combinations thereof.

In addition, once the mobile unit 4 has computed a position solution, server 14 may receive data that describes a computed synchronization bias (68). In other words, mobile unit 4 may make use of the synchronization bias, e.g., a range of system time difference, to resolve the actual system times of systems 5, 7. Server 14 may receive data defining the computed synchronization bias, and may update the database based on the received data (70). Server 14 may compare the computed synchronization bias to a predetermined threshold, e.g., a threshold difference in system times for synchronous environment 2 (72), and may issue a service message to a manufacturer or service provider for wireless communication system 7 based on the comparison (74). The service message may describe a determined functional status of one or more components within wireless communication system 7.

Although the techniques have been described generally in reference to computation of a position solution by a mobile unit, e.g., mobile unit 4 of FIG. 1, the techniques may be readily applied by positioning engines of other devices. For example, the techniques may be applied by other devices to assist in computation of position solutions for mobile units, e.g., distributed location servers, Position Determination Entities (PDEs), Location Measuring Units (LMUs), Serving Mobile Location Centers (SMLCs), Wireless Location Gateways (WLGs), Mobile Location Centers (MLCs), and the like.

Various embodiments have been described. These and other embodiments are within the scope of the following claims.

The invention claimed is:

1. A method comprising:

receiving signals from a satellite navigation system and signals from a terrestrial wireless communication system;

receiving a timing bias from the wireless communication system, wherein the timing bias includes a common system synchronization bias that defines a difference between a system time for the satellite navigation system and a system time for the wireless communication system; and determining a position solution for a mobile unit based on a hybrid position location technique for an asynchronous environment, and as a function of the received signals, a number of independent measurements based on a position location technique for a synchronous environment, wherein the number of independent measurements is fewer than a minimum number of measurements for an asynchronous position location technique, and using the common system synchronization bias.

2. The method of claim 1, wherein determining the position solution comprises:

computing the system time for the satellite navigation system;

computing the system time for the wireless communication system as a function of the computed system time of the satellite navigation system and the synchronization bias; and computing a position solution as a function of the received signals and the computed system times.

3. The method of claim 1, wherein the synchronization bias constrains the system time of the wireless communication system within a range of time from the system time of the satellite navigation system.

4. The method of claim 1, wherein the synchronization bias defines an expected time offset between the system time for the satellite navigation system and the system time for the wireless communication system.

5. The method of claim 1, wherein computing a position solution comprises computing a latitude, a longitude and an altitude for the mobile unit.

6. The method of claim 1, wherein the satellite navigation system comprises a Global Positioning System (GPS).

7. The method of claim 1, further comprising receiving data from a component of the wireless communication system that defines the synchronization bias.

8. The method of claim 1, further comprising applying an altitude-aiding technique to determine an extra measurement for use in determining the position solution.

9. The method of claim 1, further comprising:

receiving a total of M signals from the wireless communication system and the satellite navigation network;

generating M distance measurements from the signals; and detecting the presence of one or more erroneous distance measurements from one or more of the signals based on the M distance measurements and the synchronization bias.

10. The method of claim 9, wherein $M \geqq 4$.

11. The method of claim 9, wherein the position solution comprises M variables.

12. The method of claim 9, further comprising:

applying an altitude-aiding technique to determine an extra measurement; and detecting the presence of the erroneous distance measurements based at least in part on the extra measurement.

13. A method comprising:

receiving a request from a mobile unit operating within an environment having a satellite navigation system and a wireless communication system, wherein the wireless communication system comprises more than one base station;

communicating to the mobile unit, in response to the request, common system synchronization bias data that constrains a system time of the satellite navigation system as a function of a system time of the wireless communication system; and computing, a position solution for the mobile unit based on a hybrid position location technique for an asynchronous environment, based on independent measurements from more than one base station, and as a function of a number of independent measurements based on a position location technique for a synchronous environment, wherein the number of independent measurements is fewer than a minimum number of measurements for an asynchronous position location technique, and the common system synchronization bias data.

14. The method of claim 13, further comprising retrieving the synchronization bias data from a database.

15. The method of claim 14, wherein retrieving from a database comprises retrieving from a database a synchronization bias specific to the requesting mobile unit.

16. The method of claim 14, wherein retrieving from a database comprises:

identifying a current region of the wireless communication system for the requesting mobile unit; and retrieving the data from the database based on the identified region.

17. The method of claim 13, further comprising:

receiving data from the mobile unit that describes a computed synchronization bias; and updating the database based on the received data.

18. The method of claim 17, further comprising:

comparing the computed synchronization bias to a threshold bias; and determining a functional status of a component within the wireless communication system based on the comparison.

19. The method of claim 18, further comprising issuing a service message when the computed synchronization bias exceeds the threshold bias.

20. The method of claim 18, wherein the component comprises a base station within the wireless communication system.

21. The method of claim 18, wherein the component comprises a mobile unit within the wireless communication system.

22. An apparatus comprising:

one or more antennas to receive signals from a satellite navigation system and a wireless communication system, wherein the wireless communication system comprises more than one base station; and a processor to compute a position solution for a mobile unit based on a hybrid position location technique for an asynchronous environment as a function of the received signals using a number of independent measurements based on a position location technique for a synchronous environment, wherein the number of independent measurements is fewer than a minimum number of measurements for an asynchronous position location technique, and a common system synchronization bias that defines a difference between a system time for the satellite navigation system and a system time for the wireless communication system.

23. The apparatus of claim 22, wherein the satellite navigation system comprises a Global Positioning System (GPS), and the wireless communication system comprises a Code Division Multiple Access (CDMA) wireless communication system.

24. The apparatus of claim 23, wherein the apparatus comprises a mobile GPS receiver.

25. The apparatus of claim 22, wherein the synchronization bias constrains the system time of the wireless communication system within a range of time from the system time of the satellite navigation system.

26. The apparatus of claim 22, wherein the synchronization bias defines an expected time offset between the system time for the satellite navigation system and the system time for the wireless communication system.

27. The apparatus of claim 22, wherein the processor computes a latitude, a longitude and an altitude for a receiver.

28. The apparatus of claim 22, wherein the processor generates M distance measurements from the signals, and applies Receiver Autonomous Integrity Monitoring (RAIM) to detect the presence of one or more erroneous distance measurement from one or more of the signals based on the M distance measurements and the synchronization bias.

29. The apparatus of claim 28, wherein $M>N$, where N is a number of position solution variables.

30. The apparatus of claim 28, wherein $N=4$.

31. The apparatus of claim 22, wherein the processor receives data from a component of the wireless communication system that defines the synchronization bias.

32. The apparatus of claim 31, wherein the processor computes a new synchronization bias for the wireless communication system and satellite navigation system upon determining a position solution, and communicates the computed synchronization bias to the component.

33. The apparatus of claim 22, wherein the processor comprises a digital signal processor.

34. A system comprising:

a server to store common system synchronization bias data that defines a difference between a system time for a satellite navigation system and a system time for a wireless communication system, wherein the wireless communication system comprises more than one base station; and a device to receive the common system synchronization bias data from the server, and determine a position solution based on a hybrid position location technique for an asynchronous environment as a function of the common synchronization bias data and signals received from the satellite navigation system and the wireless communication system and a number of independent measurements based on a position location technique for a synchronous environment, wherein the number of independent measurements is fewer than a minimum number of measurements for an asynchronous position location technique.

35. The system of claim 34, wherein the server selectively retrieves synchronization bias data from a database based on an identifier for the device.

36. The system of claim 34, wherein the server maintains a database to store data defining a set of synchronization biases arranged in accordance with identifiers for respective regions of the wireless communication system.

37. The system of claim 34, wherein the satellite navigation system comprises a Global Positioning System (GPS), and the wireless communication system comprises a Code Division Multiple Access (CDMA) wireless communication system.

38. The system of claim 37, wherein the device comprises a mobile GPS receiver.

39. The system of claim 34, wherein the synchronization bias data constrains the system time of the wireless communication system within a range of time from the system time of the satellite navigation system.

40. The system of claim 34, wherein the synchronization bias data defines an expected time offset between the system time for the satellite navigation system and the system time for the wireless communication system.

41. The system of claim 34, wherein the device computes a latitude, a longitude and an altitude.

42. The system of claim 34, wherein the device comprises one of a mobile unit, a location server, a Position Determination Entity (PDE), a Location Measuring Unit (LMU), a Serving Mobile Location Centers (SMLC), a Wireless Location Gateway (WLG), and a Mobile Location Center (MLC).

43. A method comprising:

receiving signals from a satellite navigation system having synchronous system times and signals from a terrestrial wireless communication system; and determining a position solution for the device based on a hybrid position location technique for an asynchronous, environment as a function of the signals, a number of independent measurements based on a position location technique for a synchronous environment, wherein the number of independent measurements is fewer than a minimum number of measurements for an asynchronous position location technique, and a common system synchronization bias that defines a difference between the system times, wherein the systems comprise more than one system element.

44. The method of claim 43, wherein determining the position solution comprises:

computing a time for a first one of the systems;

computing a time for a second one of the systems as a function of the computed time of the first system and the synchronization bias; and computing a position solution as a function of the signals and the computed times for the first and second systems.

45. The method of claim 43, wherein the synchronization bias constrains the system time of a first one of the systems within a defined range from the system time of a second one of the systems.

46. A computer-readable medium encoded with a computer program comprising instructions to cause a processor to determine a position solution for a mobile unit based on a hybrid position location technique for an asynchronous environment as a function of signals received from a satellite navigation system, signals received from a wireless communication system, a number of independent measurements based on a position location technique for a synchronous environment, wherein the number of independent measurements is fewer than a minimum number of measurements for an asynchronous position location technique, and a common system synchronization bias that defines a difference between system times for the satellite navigation system and the wireless communication system, wherein the wireless communication system comprises more than one base station.

47. The computer-readable medium of claim 46, wherein the synchronization bias defines the system time of the wireless communication system as within a range of time from the system time of the satellite navigation system.

48. The computer-readable medium of claim 46, wherein the synchronization bias defines a time offset between the system time for the satellite navigation system and the system time for the wireless communication system.

49. The computer-readable medium of claim 46, wherein the instructions cause the processor to compute a position solution comprises computing a latitude, a longitude and an altitude for a receiver.

50. The computer-readable medium of claim 46, wherein the satellite navigation system comprises a Global Positioning System (GPS).

51. The computer-readable medium of claim 46, wherein the instructions cause the processor to receive data from a component of the wireless communication system that defines the synchronization bias.

52. A method comprising:

receiving sets of position related measurements for a device from a satellite navigation system and signals from a terrestrial wireless communication system, the measurements of each of the sets having a common bias with respect to the measurements of the other set; and computing a position solution for the device based on a hybrid position location technique for an asynchronous environment as a function of the measurements, wherein a number of independent measurements is based on a position location technique for a synchronous environment, wherein the number of independent measurements is fewer than a minimum number of measurements for an asynchronous position location technique, and the common bias.

53. The method of claim 52, wherein receiving sets of position related measurements comprises receiving a first set of position related measurements from a satellite navigation system and a second set of position related measurements from a wireless communication system.

54. The method of claim 53, wherein the common bias represents a difference in system times for the satellite navigation system and the wireless communication system.

55. A method comprising:

receiving sets of position related measurements for a device from a satellite navigation system and signals from a terrestrial wireless communication system;

determining different system times for each of the systems according to a common system bias; and determining a position solution for the device based on a hybrid position location technique for an asynchronous environment as a function of the measurements and the system times wherein a number of independent measurements is based on a position location technique for a synchronous environment, wherein the number of independent measurements is fewer than a minimum number of measurements for an asynchronous position location technique.

56. The method of claim 55, wherein the measurements of each of the sets having a common bias with respect to the measurements of the other set.

57. The method of claim 55, wherein receiving sets of position related measurements comprises receiving a first set of position related measurements from a satellite navigation system and a second set of position related measurements from a wireless communication system.

58. The method of claim 55, wherein receiving sets of position related measurements comprises receiving a first set of position related measurements from a first ground-based wireless communication system and a second set of position related measurements from a second ground-based wireless communication system.

59. The method of claim 55, wherein the measurements of each of the sets have a common bias with respect to the measurements of the other set, and determining a position solution comprises determining the position solution using a constraint on the system times in accordance with the common bias.

60. The method of claim 59, wherein the common bias represents a difference in the system times for the systems.

61. An apparatus comprising:

one or more antennas to receive signals from a satellite navigation system and a wireless communication system, wherein the wireless communication system comprises more than one base station; and a processor to compute a position solution for a mobile unit as a function of the received signals using a common system synchronization bias that defines a difference between a system time for the satellite navigation system and a system time for the more than one base station of the wireless communication system, wherein the synchronization bias constrains the system time of the wireless communication system within a range of time from the system time of the satellite navigation system, and the synchronization bias defines an expected time offset between the system time for the satellite navigation system and the system time for the wireless communication system, and wherein the processor generates M distance measurements from the signals, wherein the number of independent measurements is fewer than a minimum number of measurements for an asynchronous position location technique, and applies Receiver Autonomous Integrity Monitoring (RAIM) to detect the presence of one or more erroneous distance measurement from one or more of the signals based on the M distance measurements and the synchronization bias.

62. The apparatus of claim 61, wherein the processor computes the position solution by computing the system time for the satellite navigation system, computing the system time for the wireless communication system as a function of the computed system time of the satellite navigation system and the synchronization bias, and computing a position solution as a function of the received signals and the computed system times.

63. The apparatus of claim 61, wherein the processor computes a latitude, a longitude and an altitude for the mobile unit.

64. The apparatus of claim 61, wherein the processor receives, via the one or more antennas, altitude-aiding data for use in computing the position solution.

65. The apparatus of claim 61, wherein $M<N$, where N is a number of position solution variables.

66. The apparatus of claim 61, wherein the satellite navigation system comprises a Global Positioning System (GPS), and the wireless communication system comprises a Code Division Multiple Access (CDMA) wireless communication system.

67. The apparatus of claim 61, wherein the processor computes the position solution for the mobile unit based on a hybrid position location technique.

68. A method of determining a position solution for a mobile unit, the method comprising:

receiving signals from a satellite navigation system;

receiving signals from a wireless communication system, wherein a system time of the wireless communication system is asynchronous with a system time of the satellite navigation system;

receiving a timing bias value from the wireless communication system;

constraining a difference between the system time for the satellite navigation system and the system time for the wireless communication system based on the timing bias value to configure the mobile unit to a semi-synchronous mode; and determining a position solution for the mobile unit based on a hybrid position location technique for an asynchronous environment, and as a function of the received signals, a number of independent measurements based on a position location technique for a synchronous environment, wherein the number of independent measurements for the synchronous environment is fewer than a minimum number of measurements for an asynchronous position location technique.

* * * * *

UNITED STATES PATENT AND TRADEMARK OFFICE

CERTIFICATE OF CORRECTION

PATENT NO. : 7,499,712 B2
APPLICATION NO. : 10/632637
DATED : March 3, 2009
INVENTOR(S) : Riley et al.

It is certified that error appears in the above-identified patent and that said Letters Patent is hereby corrected as shown below:

Column 14, line 13, claim 65: “M<N” to read as --M>N--

Signed and Sealed this
Tenth Day of May, 2011

David J. Kappos
*Director of the United States Patent and Trademark Office*